June 2, 1931.  J. DEL PRETE  1,808,022
AUTOMATIC WARNING SIGNAL
Filed Feb. 18, 1931
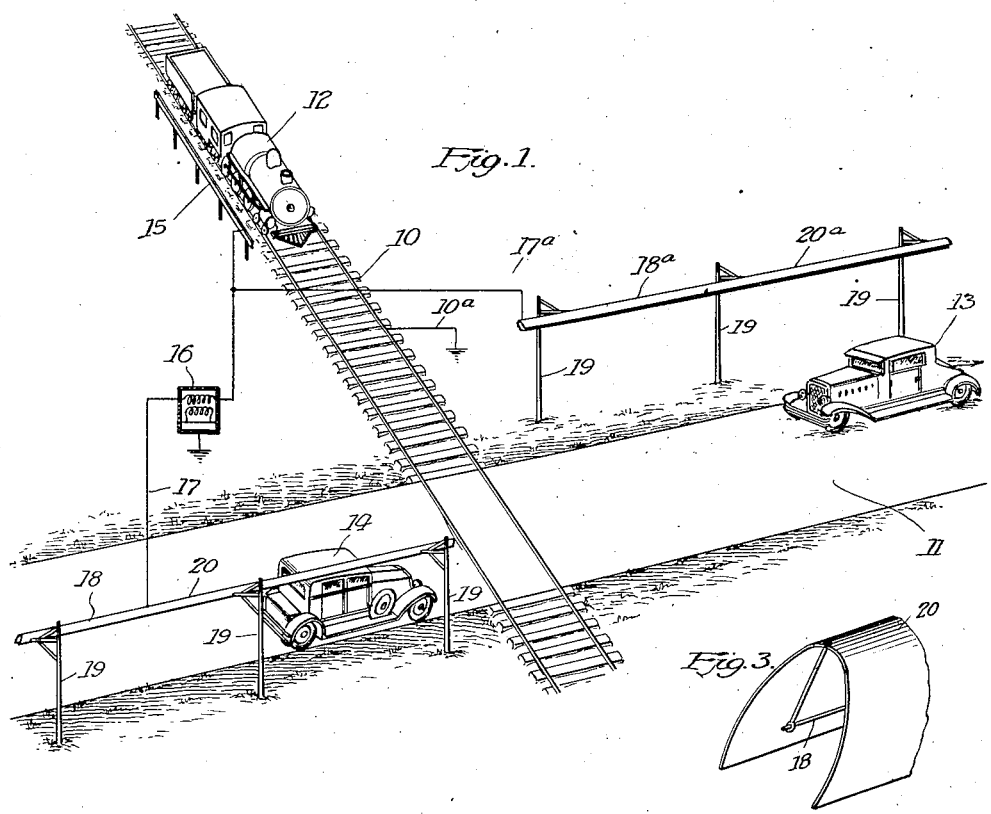
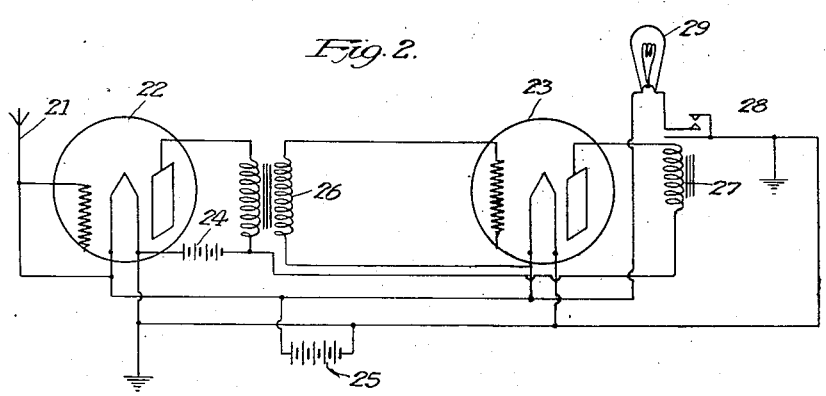
Inventor
Joseph Del Prete
By Murray & Murray
Attys.
Witness
R. B. Davison Patented June 2, 1931

1,808,022

UNITED STATES PATENT OFFICE

JOSEPH DEL-PRETE, OF CHICAGO, ILLINOIS, ASSIGNOR TO AUTOMOBILE WARNING SIGNAL CORPORATION, OF CHICAGO, ILLINOIS, A CORPORATION OF ILLINOIS

AUTOMATIC WARNING SIGNAL

Application filed February 18, 1931. Serial No. 516,528.

My invention relates to warning signals, and more particularly to a railroad crossing signal located adjacent to the crossing and cooperating with a moving vehicle approaching the crossing.

It is well known that yearly many persons are killed at railroad crossings because of lack of sufficient warning of the approach of a train, or because of lack of care and caution by the operators of vehicles approaching the crossings. Numerous and divers signals have been installed by railroads adjacent to crossings which have only partially reduced this hazard.

One of the greatest disadvantages in the signal devices now in use lies in the failure thereof to provide timely warning in bad weather when the visibility of automobile drivers is limited to a few yards. In such instances the operator is unable to stop his vehicle in time to avoid an accident, notwithstanding the operation of the signal.

An object of my invention is to provide means for automatically warning the driver of a vehicle when he is approaching a crossing over which a train is running. The warning may be given the operator by the automatic lighting of a warning bulb on the dash of the vehicle, or, if preferable, by cutting off the ignition, thus stopping the propelling power, or in any other suitable manner.

A further object of my invention contemplates the emission of high frequency waves from a suitable generator adjacent the crossing, and operable by a train running over a section of track adjacent the crossing. The waves thus sent out are picked up by suitably tuned receiving apparatus on a vehicle within the effective range of said waves, which results in the giving of a warning to the operator as above described.

A further object of my invention contemplates the use of a hollow semi-elliptical wave reflector adjacent the crossing whereby the waves generated are directed by reflection within an effective zone over the road approaching the crossing, where the same may be readily received by a vehicle within the zone. By the use of the wave reflector, and a wave of relatively low length, interference at a distance from the reflector is eliminated.

My invention will be more readily understood by reference to the accompanying drawings, in which:

Fig. 1 is a perspective, partially diagrammatic view of a railroad crossing at which the warning device of my invention is operable;

Fig. 2 is a diagrammatic view of the electrical circuit employed on a vehicle adapted to give automatic warning at a crossing such as shown in Fig. 1, and Fig. 3 is a fragmentary perspective view of the reflector of my invention.

By reference to the drawings it will be seen that my invention comprises both a fixed wave sending apparatus and a moving receiving apparatus. In Fig. 1, I have illustrated a railroad track 10, roadway 11, a train 12, and automobiles 13, 14. One track 10a is electrically grounded. At a suitable predetermined distance from the crossing, I provide an insulated flat metal plate 15 of any desirable length, supported from the ground and adapted to be presented to the wheels and under carriage of trains passing over the track. When a train is on the track opposite the plate 15, the effect of a condenser is provided, one plate being the train 12, and the other, the plate 15 whereby a certain electrical capacity will be induced in the circuit and transmitted to a high frequency wave generator 16, adjacent the crossing, which is caused to generate high frequency waves of any suitable length as long as the engine or train is opposite the plate 15. The generator may be of any desired form of electrical unit, and is not therefore specifically described.

The waves generated by the apparatus 16, are conducted through the wires 17 and 17a to the antennæ 18 and 18a located on opposite sides of the crossing and extending a suitable distance back from the same. The antennæ 18 and 18a are preferably supported by poles 19 at a suitable height from the ground, and may be disposed directly over the roadway in the manner of a trolley wire, or adjacent thereto. The antennæ are preferably suspended within the semi-elliptical metal reflectors 20, 20a whereby to provide a reflector for the waves emanating from the antennæ. The waves will thus be generally directed within a certain pre-determined effective zone over the roadway where they may be received by a vehicle within said zone, said vehicle being equipped to utilize the same.

In Fig. 2 I have illustrated a suitable electrical circuit adapted to receive the waves from the antennæ and amplify the same so that the desired warning will be given. As shown, 21 is the receiving antennæ, 22 is a rectifier tube and 23 is an amplifying vacuum tube, 24 is the grid battery, 25 filament battery, 26 a transformer, 27 a magnet coil adapted to operate a relay 28 which when closed will cause energy to flow from the battery 25 to operate a bulb 29, a solenoid to open the ignition circuit of the car, or to ring a bell, whichever form of warning is desired.

Thus it will be seen that when a train approaches the crossing, waves are automatically generated and sent out over the antennæ 18, 18a which will be picked up automatically by receiving apparatus such as described, to automatically effect the desired result.

Obviously the use of the metal plate and the operation of the generator by the induction set up between the plate and rails may be varied as desired, but it is my invention to avoid the actual employment of a circuit maker in connection with the rails to avoid possible conflict with the operation of block signals and the like on the railroad. The device as illustrated is entirely independent of other electrical circuits employing the rails and the trucks of the train.

It is conceived that the invention as above described may be subject to some modification by those skilled in the art, and I do not wish to be limited except as indicated in the appended claims.

I claim:

1. Automatic warning apparatus, comprising a section of railroad track on either side of a road crossing, a wave generator adapted to generate high frequency waves when a train is on said section of track, means including a semi-elliptical, hollow reflector for releasing said waves over a crossing adjacent to said track, and means on a vehicle within the effective range of said waves for receiving, rectifying and amplifying the same whereby to operate a signal on said vehicle.

2. Automatic warning apparatus comprising a pair of metal rails, a metal plate parallel to said rails and independent thereof, a high frequency wave generator adjacent said rails and connected to said plate, said generator being caused to operate when a train is opposite said plate by reason of the formation of a condenser thereby, means on a vehicle within the effective range of said waves for receiving the same, and means on said vehicle operable by said waves for giving visual warning when said vehicle is within said zone.

3. Automatic warning apparatus comprising a pair of metal rails, a metal plate parallel to said rails and independent thereof, a high frequency wave generator adjacent said rails and connected to said plate, said generator being caused to operate when a train is opposite said plate by reason of the formation of a condenser thereby, overhead means for releasing said waves within limits, means on a vehicle within the effective range of said waves for receiving the same, and means on said vehicle operable by said waves for giving visual warning when said vehicle is within said zone.

4. An automatic signalling device of the class described, comprising in combination, a section of railroad track, a metal plate supported independent of said track and parallel thereto, said plate serving as one plate of a condenser when a train is on said track, a high frequency wave generator operatively connected to said plate, said generator being operable through said plate when a train is opposite thereto, antennæ for discharging said generator, said antennæ being disposed above a crossing roadway, a driven vehicle, means on said vehicle for receiving, rectifying and amplifying said waves, and a warning signal operable by said receiving rectifying and amplifying means.

In testimony whereof I have affixed my signature.

JOSEPH DEL-PRETE.